United States Patent [19]

Davis

[11] 4,012,386

[45] Mar. 15, 1977

[54] PROCESS FOR MAKING PLASTIC BOWLING PINS

[75] Inventor: Charles C. Davis, Princeton, N.J.

[73] Assignee: Stokes-Trenton, Inc., Trenton, N.J.

[22] Filed: Sept. 24, 1975

[21] Appl. No.: 616,473

Related U.S. Application Data

[63] Continuation-in-part of Ser. No. 405,582, Oct. 11, 1973, abandoned.

[52] U.S. Cl. .............................. 264/250; 264/294; 264/325; 264/328; 273/82 R
[51] Int. Cl.² ...................... B29C 1/06; B29F 1/022
[58] Field of Search .......... 264/325, 328, 294, 296, 264/97, 250; 273/82

[56] References Cited

UNITED STATES PATENTS

| | | | |
|---|---|---|---|
| 2,964,319 | 12/1960 | Berry | 273/82 B |
| 3,052,925 | 9/1962 | Bronnenkant | 264/328 X |
| 3,159,701 | 12/1964 | Herter | 264/328 |
| 3,511,845 | 5/1970 | Scalora | 264/294 |
| 3,632,729 | 1/1972 | Bielfeldt | 264/328 |

FOREIGN PATENTS OR APPLICATIONS 281,381  12/1964  Australia .............................. 273/83

Primary Examiner—Richard R. Kucia
Attorney, Agent, or Firm—Sperry and Zoda

[57] ABSTRACT

A method of making a bowling pin is disclosed, incorporating both injection molding and compression molding. The pin is formed in a split cavity, into which a core pin is extendable. The disclosed method includes the steps of first injecting a quantity of high density plastic material through a gate in such fashion as to cause it to strike a specially formed, concave distal end of a core pin while the core pin is slightly retracted. The molding operation is "programmed" in such fashion as to further insert the core pin following injection of a predetermined quantity of the plastic material, whereby the core pin compresses the previously injected material. A special form of the core pin assures the distribution and compression of the injected material in such fashion as to apply, in every area of the molding cavity taken longitudinally thereof, a compressive force selected in relation to the bowling pin body wall thickness and diameter occurring in that area, thus to control voids, sink marks, and warpage in the finished product.

5 Claims, 7 Drawing Figures

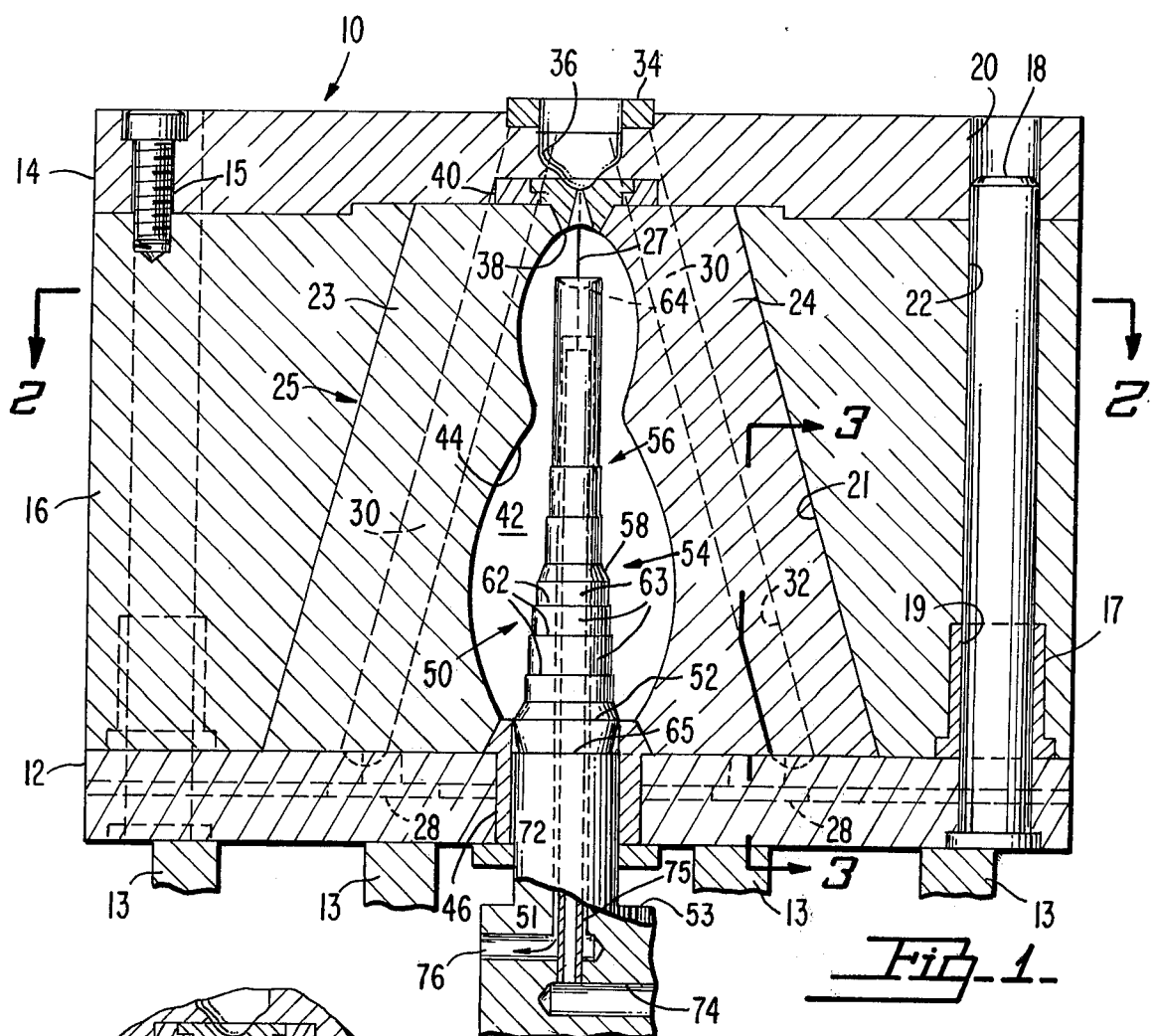
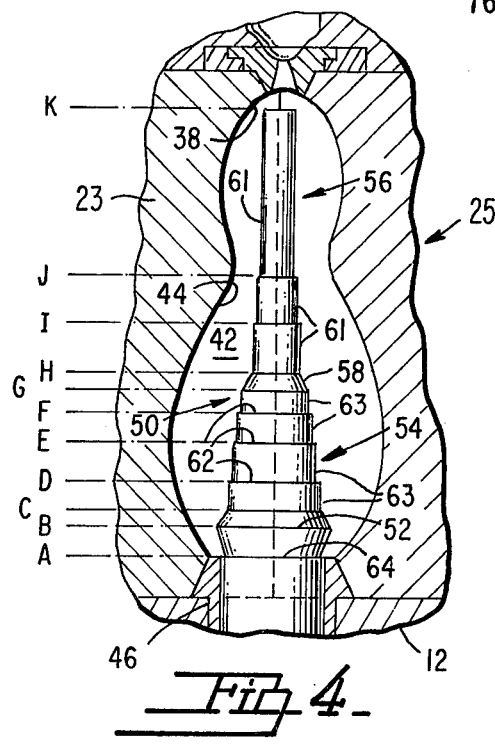
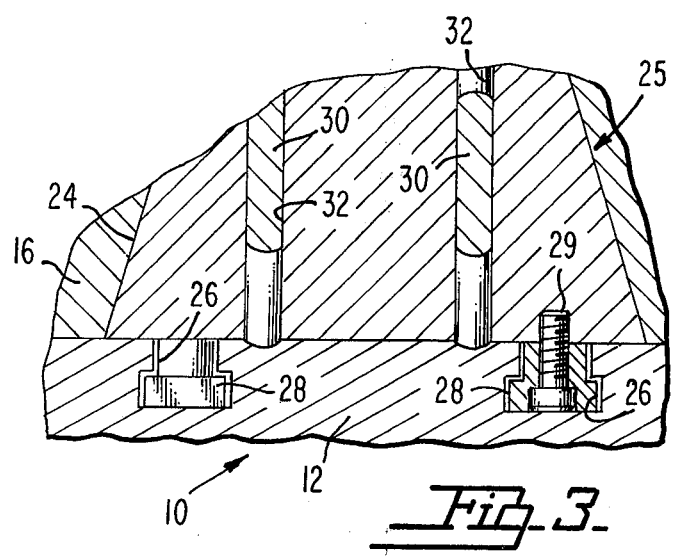

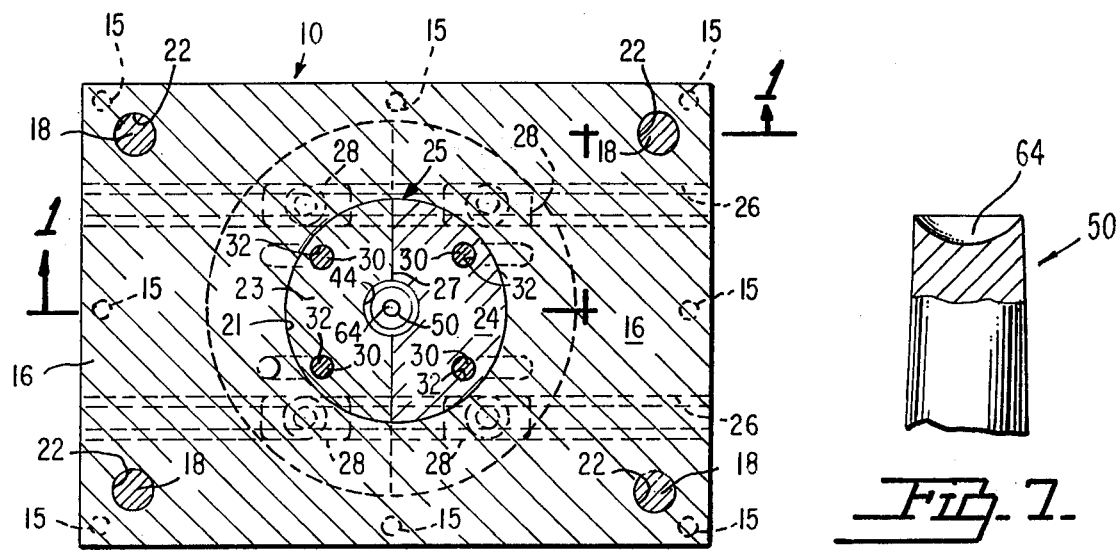
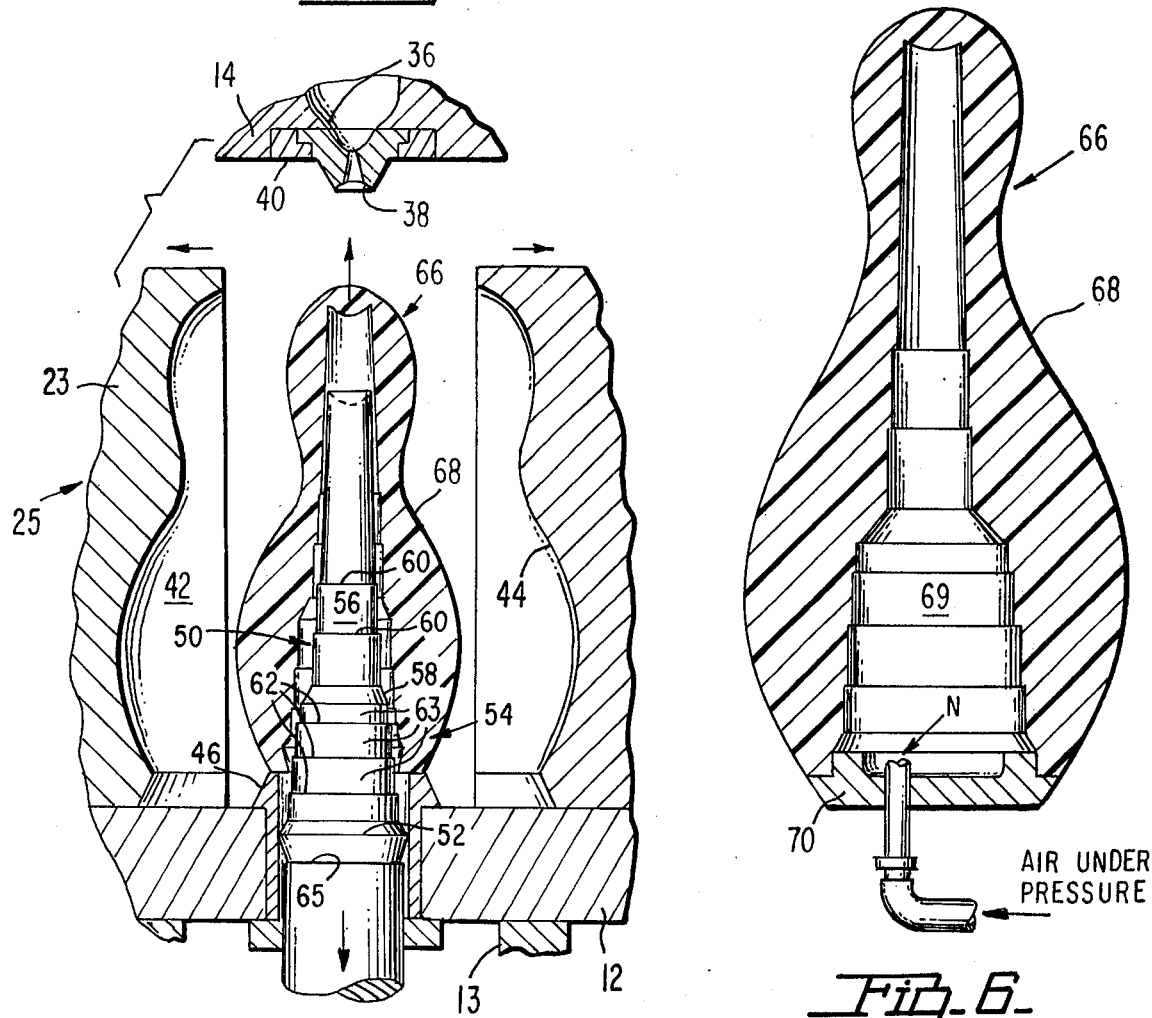

PROCESS FOR MAKING PLASTIC BOWLING PINS

RELATED APPLICATIONS

This application is a continuation-in-part of co-pending application Ser. No. 405,582 filed Oct. 11, 1973, now abandoned.

BACKGROUND OF THE INVENTION

1. Field of Invention

The invention pertains to the art of molding plastics, and in a more particular sense is specifically directed to a method of molding a bowling pin.

2. Description of the Prior Art

The prior art is known to include a number of patents disclosing plastic bowling pins and methods of making the same.

The state of the prior art as exemplified by such patents, however, does not suggest, in any bowling pin intended for use in full size bowling lanes in place of the wooden pins now used, a solid, fully molded, plastic bowling pin the entire body of which is formed in a single piece, is not of foamed plastic (though it may be if desired), is not machined, and yet has all the characteristics of wooden pins in respect to weight, strength, sound on impact, center of gravity, and resistance to dents, marks, and other damage.

A method for providing a bowling pin having this complete particular collection of properties has heretofore not been devised, so far as is known, in the prior art. Patents such as those listed above include, in some instances, a requirement for full or at least partial machining of the bowling pin during the manufacture thereof. In other instances, the body of the bowling pin is of multipart construction, requiring special interfitting of pieces, and again, in some instances, a machining operation. In still other instances, it has been suggested that foamed plastic be used, with special shells being externally provided, for the purpose of approximating the properties of a conventional, wooden bowling pin.

It has further been suggested that a molded plastic bowling pin be made according to a method utilizing a thermoplastic resin, in particular polypropylene, to which is added a blowing agent, that is to say, a foaming agent to an extent to produce a cellular structure. In this process, the molding procedure is entirely an injection molding procedure without an accompanying compression molding step. There is no suggestion, in the particular prior art development, for combining, in a method for making a bowling pin, the steps of subjecting a high density polyethylene first to injection and then to compression molding, with the compression to be effected by advancement of a core pin specially shaped to exert the compressive forces against the material in a manner particularly productive of uniform density, the minimizing of surface and internal irregularities, and the production of a finished product closely approximating a wooden pin in playing characteristics and durability.

None of the prior art pins have been conceived, designed, and constructed in such manner as to truly solve all the problems involved in duplicating the appearance, weight, dimensional stability "click" and scoring capabilities of a conventional wooden pin.

SUMMARY OF THE INVENTION

A bowling pin according to the present invention is illustrated as being of the "duckpin" type. The body of the pin is molded in a single piece, and when released from the mold is completely finished, without requirement of additional manufacturing operations except for insertion of a base plug or, if desired, the routing of an undercut for retention of said base; and of course, any customized decoration that is usual and expected in a bowling pin.

As a molded article, the bowling pin, when assembled with its base, duplicates exactly, externally, the size, shape, weight, and exact dimensions of the conventional wooden (usually maple) bowling pin. The molded body is formed, however, with a hollow interior or bore extending axially thereof and initially formed open at the base end of the pin, for closure by a base in the finished product.

The method of making the bowling pin may be summarized briefly as comprising, in its broadest aspects, a combination of injection and compression molding of a thermoplastic material. In of itself, this combination of distinct and normally separately practiced molding procedures is not new. However, in the present invention the method includes the steps of injecting, into a split cavity, a thermoplastic material which in the present instance is high density polyethylene. The material is injected against the concave distal extremity of a hydraulically axially shiftable core pin, in such fashion as to contain or minimize "jetting" of the injection material, which could not only mar the surface of the finished article, but also cause internal non-homogeneities.

In practicing the method, a core pin is used that is specially formed as a stepped, tapered member, such that there are defined axially spaced, circumferentially shoulders combined with tapers suitable for release when the core pin is retracted.

With a core pin so formed, the method of making the bowling pin includes advancing the hydraulic cylinder to further insert the core pin after the plastic material has been injected and after the gate freezes or is shut off, but while the plastic mass within the cavity is still in a molten state. This advancement of the cylinder produces a compressive force within the cavity due to the fact that the advancement of the stepped and tapered core pin reduces the total space within the cavity. The method achieves the required density, eliminates voids and sink marks, and consistently produces a finished product that is completed by the act of molding, without requirement of additional machining, and without the requirement of assembly of a multiplicity of body parts.

The inventive method is advantageously carried out in a specially designed apparatus that incorporates the particular combination of a split cavity, a double acting hydraulic cylinder to operate the combination compression plunger and core pin, and finally the core pin itself, which as previously noted is so shaped as to cooperate with the injection procedures to produce a distribution of pressure corresponding with the distribution of the mass and calculated to achieve a required density in which uniformity is materially enhanced and molding irregularities are minimized.

BRIEF DESCRIPTION OF THE DRAWING

FIG. 1 is a vertical sectional view substantially on line 1—1 of FIG. 2 through a molding apparatus designed to particularly facilitate practicing the present invention, the hydraulic cylinder and core pin being in the position established therefor during injection of the plastic material, portions of the apparatus being broken away;

FIG. 2 is a sectional view substantially on line 2—2 of FIG. 1;

FIG. 3 is a fragmentary sectional view substantially on line 3—3 of FIG. 1 illustrating the cam pin arrangement and the slidable mounting of the split cavity sections;

FIG. 4 is a fragmentary sectional view on the same cutting plane as FIG. 1, in which the core pin has been advanced from the FIG. 1 position in the next step of the process following freezing or shutting off of the gate through which the plastic material has been injected;

FIG. 5 is a view like FIG. 4 showing a further step of the operation, in which the mold has been opened and the core pin is being fully retracted from the finished molded article;

FIG. 6 is an enlarged view, partially in longitudinal section and partially in elevation, of a completed bowling pin according to the present invention; and FIG. 7 is an enlarged detail, fragmentary view, partly in section, of the distal extremity of the core pin.

DESCRIPTION OF THE PREFERRED EMBODIMENT

In practicing the invention, a mold generally designated 10 is provided, incorporating a stationary, rectangular flat support plate 12, fixedly attached to and supported upon a plurality of support rails 13 extending from and rigid with a bottom clamp plate, not shown, that would be parallel to, and would correspond dimensionally and in shape with the support plate 12.

An upper clamp plate 14 is fixedly secured, as for example by screws 15, to a rectangular cavity retaining block 16. Block 16, if desired, could be other than of rectangular shape; for example, it could be round.

When the mold is being opened or closed, the upper clamp plate and its attached block 16 are moved away from or toward the stationary support plate 12, being guided in said movement through the provision of four leader pins 18 (FIGS. 1 and 2), rectangularly spaced as shown to particular advantage in FIG. 2, and disposed within registered bores 20, 22 of the upper clamp plate 14 and retainer block 16 respectively. Pins 18 are fixedly secured within the support 12, and in a preferred embodiment extend through bushings 17 engaged in counterbores 19 of bores 22.

Centrally formed in block 16 is a frusto-conical bore 21 snugly receiving, in the closed condition of the mold shown in FIGS. 1 and 2, opposed split cavity sections 23, 24, cooperating to define a frusto-conical cavity generally designated 25. As seen from FIG. 2, when the mold is closed, the cavity sections 23 and 24 are brought into tightly abutting relationship, engaging in face-to-face relationship along the parting line 27 of the mold.

The cavity sections 23 and 24 are mounted for sliding movement toward and away from each other upon support plate 12. In FIG. 1, as previously noted, the cavity sections have been moved toward each other into their abutting relationship, to permit molding of the article within the cavity. In FIG. 5, however, the cavity sections have been moved outwardly from each other as shown by the direction arrows adjacent thereto, to part the mold for extraction of the finished article.

In order to provide the slidable mounting of the cavity sections 23, 24, a pair of slideways 26 (FIGS. 2 and 3) are formed in the support plate 12, said slideways being formed as elongated, continuous grooves undercut to receive the heat portions of gibs 28 attached to the respective cavity sections 23, 24 by screws 29. Referring to FIG. 2, each cavity section is provided with two gibs, said gibs being of rectangular form, and being received snugly yet slidably within the slideways or grooves 26. In this way, the cavity sections are mounted to move toward each other, along the slideways to the molding position shown in FIG. 1, or alternatively, away from each other as shown in FIG. 5, to part the mold and release the finished article.

At each side of the part line 27 and symmetrically disposed in respect thereto are elongated cam pins 30 (FIGS. 1, 2, and 3), there being two pairs of cam pins, one pair for each cavity section, the pins of each pair being parallel as shown in FIG. 3 and the pairs diverging downwardly as shown to best advantage in FIG. 1.

The several cam pins are secured to the top clamp plate 14 for movement therewith toward and away from the stationary support plate 12. When the mold opens, pins 30, moving away from plate 12, exert a cam action upon the cavity sections 23, 24, tending to bias them away from each other. Sections 23, 24 thus move away from each other, sliding upon the top surface of support plate 12 through the provision of the gib-and-slideway means 28, 26. Support plate 12, for this purpose, is provided with wear plates, not shown, upon which the cavity sections move toward and away from each other according to whether the mold is being closed or opened.

Centrally recessed in top clamp plate 14 is a locating ring 34 extending about an orifice 36 in communication with a gate 38 mounted in the bottom surface of top clamp 14 through the provision of a sprue bushing 40 affixed to the plate 14.

A core pin generally designated 50 is activated by a hydraulic cylinder (not shown) and is axially shiftable within a bushing 46 centrally mounted in plate 12. The core pin 50 extends axially within a mold chamber 42 having a wall 44 which, in the closed condition of the mold, defines with exactness the exterior configuration of a bowling pin.

A washer 51 for regulating and adjusting the length of stroke, and consequently the density of the molded product, is provided between the lower end of bushing 56 and a shoulder 53 of the core pin. Core pin 50 is formed with a circumferential enlargement or collar 52, and extending upwardly from collar 52 is a proximal or base section 54 of the core pin extending through approximately one-third the overall, axial distance between the collar and the distal extremity of the pin. Base section 54 merges, at its upper end, into a distal section 56 of the pin. At the juncture between the sections 54, 56, the diameter of the core pin is stepped down substantially, defining a pronounced circumferential shoulder 58 at this location. The diameter at the tip of the core pin is on the order of approximately one-fourth the diameter of the base end thereof.

Adjacent shoulder 58, the distal section 56 is formed, at uniformly spaced intervals, with a pair of continuous circumferential, relatively narrow shoulders or steps 60. The remainder of the distal section has a smooth taper uninterrupted over the distance between the upper step 60 and the tip of the core pin. At intervals over its entire axial dimension, base section 54 is stepped or shouldered as at 62.

Thus, the core pin sections 56, 54, through the provision of the steps 60, 62, thereof, are each divided into a series of step portions 61, 63 respectively. The portions 61, 63 are tapered in a direction toward the distal end of the pin.

It may therefore be noted that in a direction toward the gate 38, the core pin is, as a basic characteristic thereof, first given a positive taper from its base extremity 65 to adjacent collar 52, and is then progressively reduced in cross sectional area over its full length, inasmuch as there is a negative taper on all the portions 61, 63 thereof, which would effect this continuous reduction in cross sectional area of the core pin even if the shoulder 58 and the several steps or shoulders 60, 62, were not incorporated in the core pin construction.

Further with reference to the characteristics of the core pin, it may be observed that in another sense, the core pin is stepped down in diameter at intervals over the full axial dimension thereof as taken from the collar 52 to the distal extremity of the core pin, even independently of the progressive tapering of the pin. And, in yet another sense, it may be observed that the core pin mass is progressively reduced in diameter from the larger to the smaller end of each pin portion 61 and 63, is then imparted a pronounced reduction in diameter at the juncture of adjacent portions 61 or 63, and further, has a still further pronounced, sudden reduction in diameter substantially midway between the ends of the pin, at the location of the shoulder or ledge 58.

In practice, excellent results have been obtained in molding a conventionally sized duckpin, if the process according to the present invention is carried out with a core pin constructed (see FIG. 4) as follows:

| Plane | Core Pin Diameter (Inches) |
| --- | --- |
| A | 2.012 |
| B | 2.037 |
| C | 1.939 |
| D | 1.912 |
| E | 1.885 |
| F | 1.858 |
| G | 1.846 |
| H | 1.238 |
| I | 1.208 |
| J | .906 |

In said pin, vertical increments and tapers productive of good results were as follows:

| Dimension | Vertical Increment |
| --- | --- |
| A-B | .458 |
| B-C | .293 |
| C-D | .480 |
| D-E | .604 |
| E-F | .604 |
| F-G | .300 |
| G-H | .304 |
| H-I | .904 |
| I-J | .903 |
| J-K | 3.400 |

The core pin has been found to provide a markedly superior molded product, an aspect of the invention which will be discussed in greater detail during the discussion of the actual operation, hereinafter.

At the smaller, tip end of the core pin 50, there is provided a concave recess 64 (FIG. 8) which during the molding of the bowling pin, is disposed in axial alignment with and in comparatively closely spaced relation to gate 38.

A bowling pin formed according to the present invention has been shown in FIG. 6, and has been generally designated 66. Exteriorly, as shown as 68 the bowling pin is completely conventional in respect to proportions, size, shape, and all dimensional characteristics. The bowling pin, further, has been so designed as to have a surface hardness that has qualities improved above that of the conventional wooden maple product now used, not only from the standpoint of sound or click when struck by a bowling ball or another pin, but also in respect to durability without visibly being affected by the heavy battering which a bowling pin takes during regular use. In practice, a pin made according to the present invention matches and often exceeds the performance of a wooden pin as regards ability to withstand the almost constant battering to which it is subjected in use.

The finished bowling pin, as will be understood, has a centrally disposed, axially extending bore 69, corresponding to the shape of the core pin, and closed in the finished product by a base 70, which is fixedly engaged in the larger end of the bore. As a result, the finished bowling pin, exteriorly, appears to be a completely solid article, but interiorly, has a hollow center in the form of an elongated, axially extending chamber tapering and stepped from the base end toward the upper end of the pin correspondingly to the configuration of the core pin 50.

The base 70 is removable when necessary after the bottom surface, which contacts the alley, is battered to an extent such as would interfere with verticality and stability of the pin upon setting. The removal of the base 70 is effected by insertion of a hollow needle, such as a hypodermic needle N, with suitable means of applying air or other gas pressure attached. This is inserted through the base 70 into the hollow center of the bowling pin and the base 70 is thereafter removed by pressure directed into the hollow interior of the bowling pin (see FIG. 6).

OPERATION

In use of the apparatus, the mold is closed and the hydraulic ram 48 may be retracted to the extent shown in FIG. 1. In these circumstances, the collar 52 is coplanar with and in contact with the upper end of the bushing 46, thus closing said bushing at the upper end thereof, at this particular stage of the operation.

This may be considered as the "retracted" position of the hydraulic cylinder and hence of the core pin 50. At this stage of the operation, the distal extremity of the core pin is spaced downwardly from the gate a distance of perhaps 1 to 1½ inches from the gate, directly in axial alignment therewith.

The molding material is now injected, and in a preferred embodiment is a polyolefin, in particular high density polyethylene to which a foaming agent is added only in a very small amount, no more than is necessary to control any tendency of the polyethylene toward evidencing non-homogeneities when molded. To produce optimum results, the material to be molded should be selected from the group of plastics known generally in the trade as "high density polyethylene." Within this general class of plastics, to produce a bowling pin that most closely resembles a hardwood maple pin in play and in durability, the high density polyethylene should, when molded according to the present invention, incorporate a specific gravity on the order of 0.95–0.965; a melt index in the range of 0.3–5.0; and a Shore durometer of 60 to 65.

A plastic material that has been used to good advantage is the product sold by the Phillips Petroleum Company of Bartlesville, Oklahoma, as "Marlex EHB 6015." This has the desired physical properties, and specifically possesses properties as follows:

| Density (specific gravity) | .960 |
|---|---|
| Melt Index | 1.5 |
| Flexural Modulus | 220,000 psi |

The material as described has excellent qualties as regards impact strength, stress-crack resistance, and toughness.

In practicing the method comprising the present invention, I find it desirable to add no more than a very small amount of a foaming agent, as for example, the product "CELOGEN" manufactured by Uniroyal Chemical Division of Uniroyal, Inc., Naugatuck, Conn. Normally, a foaming agent would be added to a high density polyethylene at a ratio of about 7 ounces of the agent to 100 lbs. of the polyethylene material. I find it desirable to use no more than between 5% and 25% of the normal application, however, and this serves to control any tendency toward the production of non-homogeneities in the finished product.

In practice, the molding cavity 42 is not packed full as it would be in a normal injection molding procedure. A measured amount of material is used so that the weight of the finished pin can be predetermined and so, controlled.

With the plastic material injected, a time lapse of about 15 seconds occurs during which the gate is frozen or shut off, so that there is no more flow of material possible in either direction through the gate. At this point, however, while the material is being injected through the gate prior to its being frozen or shut off, a normal tendency to produce voids in the finished, molded mass is avoided, and in addition surface imperfections are also avoided due to the manner in which the material is injected and cooperates with the core pin. The material is injected through a very small gate, whereas normally, a large gate would be needed to avoid the formation of voids. It is known, in this regard, that voids are produced by the normal tendency of the plastic to contract within the molding cavity. Using a very small gate, in a preferred embodiment a gate of approximately 0.078 inches diameter, and injecting the material into direct engagement with the concave surface 64 on the end of the core pin, a uniform distribution of the injected material, at first radially and then axially of the molding cavity, is achieved, with the material being deflected outwardly by the concave surface in all directions. This eliminates the formation of "squiggles", that is, this contains "jetting" of the material, a characteristic found in typical injection molding procedures and definitely to be avoided in view of the tendency to create voids within the cured mass after cooling of the molded article, or surface imperfections.

With the gate frozen to stop further injection of the molding material, the hydraulic cylinder is now advanced from the FIG. 1 to the FIG. 4 position. This advance, in a working embodiment of the invention, occurs while the injected material is still in a molten state, and is to an extent sufficient to pack the cavity full, that is, an extent sufficient to compensate for the change in volume of the plastic mass as it cools, and maintain sufficient compression to achieve the required density in the finished product.

The compression occurs, as will be understood, by reason of the fact that upon advance of the hydraulic cylinder or ram, the total cubic content of the core pin within the molding cavity is increased to the extent defined between enlargement 52 and the shoulder 65. It is of course to be understood that the exact amount of plastic material to be injected initially, the exact extent to which the ram should be advanced, and the timing of said advance, are all relative factors to be determined, using accepted plastics molding engineering practices and data obtained by running the actual mold.

For the purposes of the present discussion, it is sufficient to note that an important factor in achieving as truly a homogeneous mass as possible of uniform density throughout, results not merely from a combination of injection and compression molding (since this is old in and of itself), but rather, by a predetermined distribution of the pressure to correspond with the distribution of the mass. This distribution of the pressure, as the ram advances, results from the use of a series of shoulders 58, 60, 62 and/or tapers in the portions 61, 63. The concept productive of the desired results, thus, is achieved by combining a particular core pin formation as previously described herein and utilization of a high density polyethylene, with the known procedure of combining injection and compression molding of thermoplastic materials.

When the amount of feed and the timing is properly calculated, the hydraulic cylinder and the core pin will "bottom out" as it packs the cavity full. The plastic mass continues to cool in the mold for a suitable time, long enough that the reduction in volume is sufficient to finally relieve the compression applied by the ram to the point where the molded pin will retain its shape upon removal.

The press is now opened slowly, to move the upper clamp plate and the block 16 away from the support plate 12, as shown in FIG. 5. This causes the cavity sections 23, 24 to be parted as shown in FIG. 5. The hydraulic ram is now retracted sufficiently so as to release by the combination of tapers and steps to allow the molded article to be removed.

Thereafter, the completed bowling pin 66, having an exterior configuration matching that of a wooden bowling pin, and having stepped bore 69, is closed by a base plug 70.

The mold will of course be provided with water circuits as needed, and these are considered sufficiently obvious as not to require special illustration, since the nature and location of water circuits have always been capable of calculation without difficulty, according to the particular shape of the mold, the amount of plastic material injected, and other factors well known to those working in the art. It is sufficient to note that for the purpose of the present invention, three water circuits will be utilized. There would be one water circuit in each of the cavity sections 23, 24, and these would be circulating circuits. A third water circuit would be provided, extending upwardly for almost the full length of the core pin axially thereof, and would include an axial bore 72 in the core pin. Water is supplied through an inlet 74, and passes upwardly in the core pin bore 72 within a tubular baffle 75 mounted axially within the bore in spaced relation to the wall of the bore. The upper end of the baffle is open and terminates below the upper end of the bore 72, so that water bubbles up out of the baffle, passing downwardly within the bore 72 and exiting through a side outlet 76.

It has been proposed to injection-mold plastic bowling pins from a material such as polypropylene, with a cavity produced by a core pin. However, to my knowledge no wholly molded, one-piece bowling pin body has heretofore been successfully produced that will duplicate the playing characteristics and durability of a conventional wooden bowling pin. In actual practice, however, bowling pins made according to the method hereinbefore described do meet these difficult requirements, by combining use of a high density polyethylene having added thereto a foaming agent in no more than a very small amount, use of a combined injection and compression molding technique, and use of a core pin which is specially shaped to distribute the compressive forces, is designed to deflect the injected material in such fashion as minimize molding irregularities, and is used as the means for applying the compressive forces by advancement in the mold following the injection procedure.

I claim:

1. A method of making a high impact plastic bowling pin as a two-part product having as one of its parts a hollow body formed open at one end and shaped wholly by a molding operation from a thermoplastic material in the polyolefin group that includes high density polyethylene, and having as its second part a base plug sealably closing said end of the body, that comprises the steps of injecting said material in a molten liquid state into a molding cavity the wall of which has a configuration corresponding closely to the external contouring and dimensions of the body of the finished pin; deflecting the injected material within the cavity transversely of the cavity in paths extending radially outwardly from the axis thereof, over the full circumference of the cavity; thereafter subjecting the injected material while it is still in a molten state to a compressive action until it becomes an integral, homogeneous, thick-walled mass of uniform high density over its entire area; cooling the molded body with the cavity to an extent effective to relieve the compressive force; separating the molding cavity from the body; and finally; applying said base plug in position sealably closing the open end of the body to provide the finished two part product, the side wall of the bowling pin varying in thickness and in external diameter, the step of compressing said material including varying the compressive forces exerted against the injected material by applying, in every area of the molding cavity taken longitudinally thereof, a compressive force that is selected in relation to the wall thickness and diameter of the bowling pin body occurring in that area.

2. A method of making a high impart plastic bowling pin as a two-part product having as one of its parts a hollow body formed open at one end and shaped wholly by a molding operation from a thermoplastic material in the polyolefin group that includes high density polyethylene, and having as its second part a base plug sealably closing said end of the body, that comprises the steps of injecting said material in a molten liquid state into a molding cavity the wall of which has a configuration corresponding closely to the external contouring and dimensions of the body of the finished pin; deflecting the injected material within the cavity transversely of the cavity in paths extending radially outwardly from the axis thereof, over the full circumference of the cavity; thereafter subjecting the injected material while it is still in a molten state to a compressive action until it becomes an integral, homogeneous, thick-walled mass of uniform high density over its entire area; cooling the molded body within the cavity to an extent effective to relieve the compressive force; separating the molding cavity from the body; and finally; applying said base plug in position sealably closing the open end of the body to provide the finished two part product, said pin varying in the thickness of its side wall and in its external diameter over its length, said method further including compressing the injected material by inserting a core pin having a diameter changing over the length thereof in a predetermined relation to the changing side wall thickness and diameter of the bowling pin to achieve homogeneity and uniformity of the molded mass.

3. The method of forming a high impact, high density, hollow-center, thick-walled bowling pin characterized by an absence of voids and surface imperfections, in a mold that includes a mold cavity having a gate at one end and a core pin extending into the cavity through the other end thereof, said bowling pin being a two-part product that includes a hollow body open at its base end and a plug sealably closing the same at said end, at least the body being produced in its finished form entirely by a molding operation, comprising the steps of first, retracting the core pin within the cavity to an extent such that an end of the core pin is spaced from the gate in axial alignment therewith; then, injecting high density polyethylene in a hot, molten condition and in an amount less than would be required to fully pack the cavity against said end of the pin to deflect the material radially outwardly of the pin against the wall of the cavity throughout the circumference thereof; then, terminating the flow of said material into the cavity; thereafter, while at least the interior of said material remains in a molten state, advancing the core pin within the cavity to an extent that will effectively achieve a predetermined required density in the finished product and will compensate for volumetric changes in the mass of injected material occurring as a consequence of cooling thereof; cooling said body within the molding cavity at the conclusion of the compression thereof to an extent effective to afford relief from the compressive action exerted thereagainst; removing the cooled body from the mold; and finally, applying said plug in sealing relation to the open base end of the body to produce the bowling pin in the shape, dimension, and with the high impact characteristics of a hardwood bowling pin, said bowling pin varying in external diameter and in wall thickness over its length, said method further including distributing the compressive pressure exerted upon said mass by the core pin in correspondence with the distribution of the mass resulting from said varying external diameter and wall thickness.

4. A method of making a bowling pin as in claim 3, that includes progressively reducing the diameter of the core pin, in the direction of said end thereof, by increments each of which is selected according to the distribution of a plastic mass in the vicinity thereof to achieve a uniform homogeneity and density of the finished product sufficient to impart thereto the playing characteristics of a wooden bowling pin.

5. A method of making a bowling pin as in claim 4, further including incrementally stepping down the core pin diameter in the direction of said end thereof in a predetermined relation to the areas of the plastic mass immediately adjacent the stepped increments.

* * * * *